IONIC SWITCH ASSEMBLY

Filed Jan. 9, 1962 2 Sheets-Sheet 1

WITNESSES

Gordon H. Telfer

Edwin L. Bauler

INVENTORS
Paul O. Raygor &
Juris A. Asars
BY
Charles F. Renz
ATTORNEY 3,218,515

IONIC SWITCH ASSEMBLY

Paul O. Raygor, North Huntingdon Township, Westmoreland County, and Juris A. Asars, Monroeville, Pa., assignors to Westinghouse Electric Corporation, East Pittsburgh, Pa., a corporation of Pennsylvania Filed Jan. 9, 1962, Ser. No. 165,180
7 Claims. (Cl. 315—325)

This invention relates generally to structures and methods for providing arrays of conductors with precisely controlled and uniform spacing between pairs of the conductors. More particularly, this invention relates to structures and methods for providing an ionic switch assembly.

An ionic switch is a device which conducts upon an ionic discharge between two points. In general, two electrodes with an ionized gas therebetween are the essential features of the switch. When a potential is applied across the electrodes sufficient to cause a discharge in the gas, the switch becomes conductive. Ionic switches are symmetrical and have two stable states, in one of which the switch exhibits an extremely high resistance and in the other resistance which is lower by many orders of magnitude. Therefore, ionic switches have desirable switching characteristics for many applications.

One such application of present interest is in the field of display devices, particularly solid state display devices, of many individually controllable light producing elements to which signals must be applied. It is important in ionic switch applications that the gaps of the various switches be precisely controlled at very close spacings which may be of the order of microns. This is necessary for uniformity in firing. It is also necessary that the individual switches have electrodes which are of sufficient cross-sectional area to carry the necessary current and are sufficiently planar so as to provide a uniform switching characteristic since any irregularity on the electrode surface will cause irregular firing and uneven wear of the electrode. In addition, display screen applications impose a requirement of small size so that the element size of the display may be small for good resolution. It is also necessary to be able to fabricate an array of ionic switches at moderate cost. This, of course, precludes lining up the individual electrodes manually. Various known ways for providing the necessary array include conventional machining, electron beam machining, photoetching and other techniques which failed to produce smooth and parallel electrodes surfaces with the desired spacing and cross-sectional area for a solid state display screen application. Alternatives to ionic switches, such as switching diodes have been found to the present to be more exepnsive or even unavailable with the desired characteristics.

It is, therefore, an object of the present invention to provide an improved ionic switch assembly and method for making the same.

Another object is to provide an ionic switch assembly and methods for making the same which provide a uniform close spacing of relatively large area electrodes in an array of many ionic switches.

Another object is to provide an improved ionic switch assembly which is particularly suitable for use in the control structure of the solid state display device.

In accordance with the present invention, an ionic switch assembly is provided which comprises two electrode carrier members each having a planar reference surface and an electrode mounting surface with at least one electrode affixed thereon. For efficiency in fabricating large arrays of ionic switches, a plurality of electrodes are mounted on each electrode mounting surface. The electrodes extend to a position which is a distance from the reference surface determined by the desired electrode spacing and switching characteristic. The carrier members ar secured together with the reference surfaces parallel and electrodes on the carrier member aligned in pairs.

In accordance with other features of the invention, an improved method of making an ionic switch assembly is provided which generally comprises obtaining two electrode carrier members which each have a planar reference surface and an electrode mounting surface and mounting at least one electrode on each of the electrode mounting surfaces. That portion of each of the electrodes which extends beyond the desired position is then removed, for example, by grinding and lapping to locate the electrode ends in the plane of the reference surface and then electro-polishing to obtain the desired displacement from the plane of the reference surface. The carrier members are bonded together with the reference surfaces parallel and the electrodes on each carrire aligned in pairs so as to provide a permanent structure of uniformly spaced electrodes.

The features of the present invention which are believed to be novel are set forth with particularity in the appended claims. The present invention, both as to its organization and method of fabrication together with the above-mentioned and further objects and advantages thereof, may best be understood by reference to following description, taken in connection with the accompanying drawings, in which:

Figure 1:
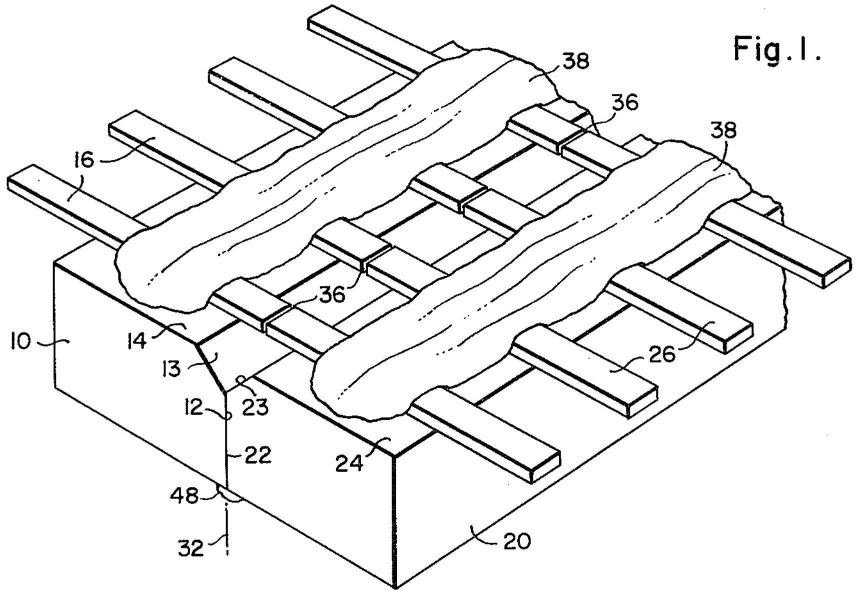
FIGURE 1 is a perspective view of an ionic switch assembly in accordance with the present invention.

Referring now to FIGURE 1, there is shown an ionic switch assembly which includes first and second electrode carrier members 10 and 20 which are of a suitable rigid insulating material. The electrode carrier members 10 and 20 are each a mirror image of the other carrier member and the two are joined together along planar surfaces 12 and 22 which define a reference plane 32. Each of the carrier members 10 and 20 also has an electrode mounting surface 14 and 24 which is perpendicular to the reference surfaces 12 and 22 and is separated therefrom by a beveled portion 13 and 23.

Electrodes 16 and 26 are disposed on each of the electrode mounting surfaces 14 and 24, respectively, in a direction generally perpendicular to the reference surfaces 12 and 22. Each electrode 16 is aligned with an electrode 26 on the other electrode carrier member to define a gap 36 across which the switching discharge occurs. A quantity of bonding material 38 is disposed over the electrodes 16 and 26 on each carrier member 10 and 20 to form a permanent attachment to the electrode carrier member.

A similar bonding material 48 is also applied to the edges of the reference surfaces 12 and 22 to join the carrier members 10 and 20 together in a unitary structure. The bonding material 48 is such that by capillary action a thin film of it is spread over each of the reference surfaces 12 and 22.

Figure 2A:
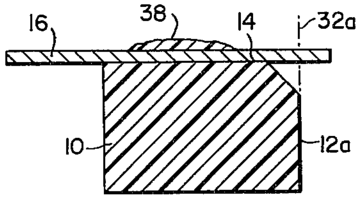
FIGURE 2A through 2D are views of the ionic switch assembly of FIGURE 1 after various stages of processing.
Figure 2B:
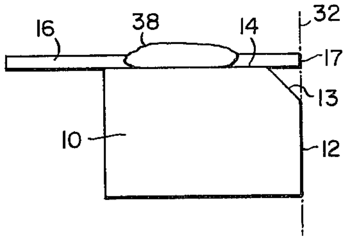

Referring to FIGURES 2A through 2D, the various steps in forming an array such as that shown in FIGURE 1 will be discussed. Each of the carrier members 10, as in FIGURE 2A, has electrodes 16 bonded by insulating material 38 to the electrode mounting surface 14 so that the end of the electrode extends past the plane **32*a* of the side surface 12*a* which is substantially perpendicular to the mounting surface 14. The end of electrode 16 and usually some of carrier surface 12*a* are then removed simultaneously so that the end surface 17 of the electrode is approximately in the same plane 32** as the final reference surface which is now established. The deviation can be held to less than one micron. The resulting structure is shown in FIG. 2B.

Figure 2C:
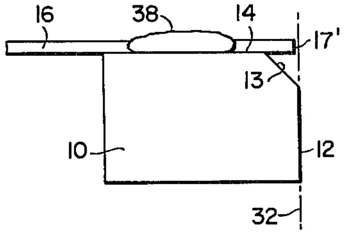

In FIGURE 2C, the structure is shown after the electrode 16 has been further processed so as to displace the end surface 17′ from the reference plane 32 by a distance which is half of the desired gap. The necessary gap width is, of course, determined by the required firing characteristic and may be determined by known calculation methods or by trial and error.

Figure 2D:
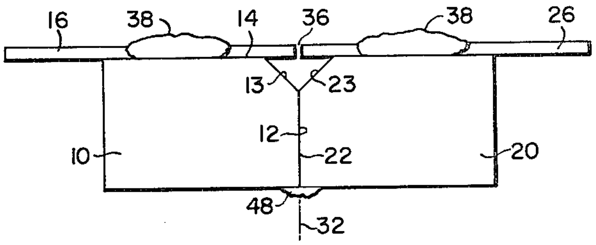

In FIGURE 2D, two electrode carrier members 10 and 20 with the electrodes 16 and 26 thereon processed in the foregoing manner have been joined together with electrodes aligned so that each defines a gap 36.

As a particular example of the practice of the present invention, an ionic switch assembly substantially like that shown and described in FIGS. 1 and 2 was formed wherein about twenty electrode carrier members 10, 20, etc. were lined up and electrodes were fastened to all twenty of the carriers with 16 to the linear inch. Then by ordinary machine cutting, the carrier members were separated by cutting through the electrodes. They were cut so that each electrode 16 extended past the plane **32*a* of the carrier on which it was mounted and also extended some appreciable distance beyond the carrier in the opposite direction, the latter extension being merely so as to provide means for making contact to the electrode. This stage is shown in FIG. 2A. The electrodes 16** had cross sectional dimensions of 0.005 by 0.015 inch and were composed of an alloy of 90% platinum and 10% iridium. Of course, other materials and dimensions may be used as dictated by the application.

The carrier members were of steatite, an aluminum silicate mineral available from American Lava Co., having dimensions of 0.060 by 0.040 by 0.995 inch. A beveled portion 13 of 0.010 inch was provided to minimize leakage current in the resulting structure.

A thermosetting insulating material 38 was used to bond the electrodes to the mounting surfaces. A particular composition found suitable was 77% Epon 828 which is a proprietary epoxy resin of Shell Chemical Corp., 20% ERL 2793 which is an epoxy resin curing agent comprising diethylene triamine, 3% Cab-O-Sil which is a proprietary silica gel of Godfrey L. Cabot, Inc. and a trace of nigrosine dye which was added in order to make the composition opaque so that it could be more easily applied with accuracy.

The electrodes 16 and 26 were aligned with the reference surfaces 12 and 22 by grinding with a grinding wheel of brass with diamonds embedded therein and lapping on a surface of diamond embedded plastic to provide a smooth surface within about a micron and establish the reference plane 32.

The electrode ends 17 were electropolished to remove small burs and to establish the precise electrode position from the reference surface 12 which was approximately two and one-half microns. The electropolishing solution consisted of 90% by weight $H_2O$, 8.3% $CH_3OH$, 1.0% KCl, 0.5% KOH, and 0.2% KCN. Voltage and time conditions are selected by techniques well known to the art to remove the desired amount of material.

A pair of carriers 10 and 20 were joined together with the reference surfaces 12 and 22 coincident and the electrodes 16 and 26 aligned to provide uniform gaps of about 5 microns or 0.0002 inch. Bonding material 48 to join the carrier members is also a thermosetting insulating material similar to that above but consisting of 80% Epon 828, 20% ERL 2793 and a trace of black dye. The omission of the silica gel was to provide a solution of low viscosity which could be transmitted between the reference surfaces 12 and 22 by capillary action and provide a very thin film between the carrier members 10 and 20.

In the foregoing manner, ionic switch assemblies have been fabricated with required characteristics and uniformity. The particular structure of the example was operated in air at atmospheric pressure with a firing voltage of 400 v. and a sustaining voltage of 320 v. Also, this method and structure provides an open space around the electrode gap 36, due to the beveled portion 13, to prevent the accumulation of electrode material upon wearing which would promote leakage between the electrodes 16 and 26.

The method of the present invention readily lends itself to mass production of ionic switch assemblies including many electrode pairs since all of the electrodes on a pair of carrier members can be produced simultaneously with uniform spacings. Furthermore, the present method readily lends itself to incorporation of the ionic switch assembly within a more complex component including other carrier members on which circuit elements formed by printed circuit techniques are disposed.

Figure 3:
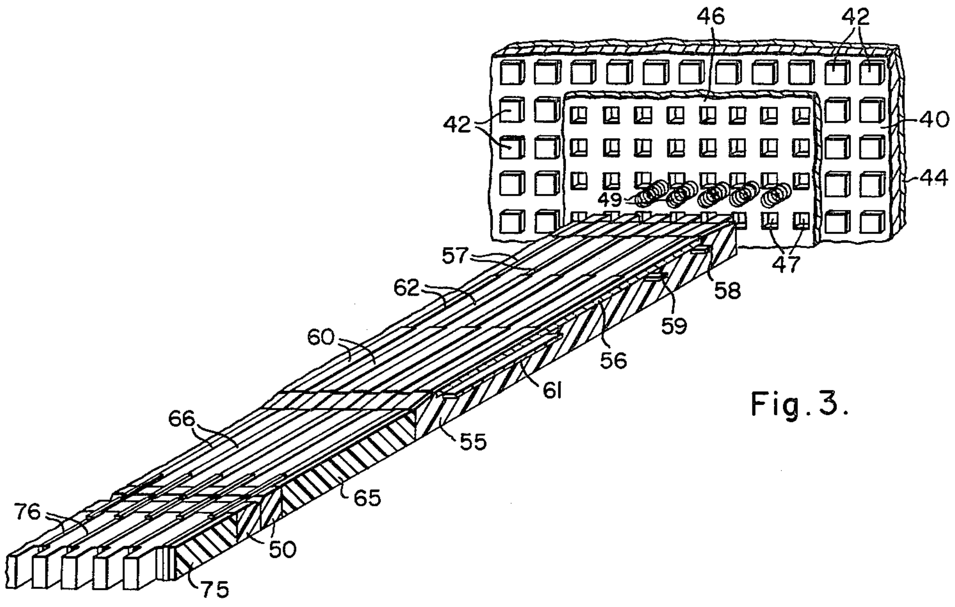
FIGURE 3 is a partial perspective view of a solid state display device incorporating an ionic switch assembly in accordance with this invention.

A structure is shown in FIGURE 3 where the ionic switch assembly is part of the control structure for a solid state display device including an electro-luminescent cell 40 having a plurality of individually controllable light producing elements. The particular control mechanism employed in the structure shown is not a feature of the present invention. The structure shown was designed to provide a bridge type control circuit for each of the electroluminescent elements wherein ferroelectric capacitors are caused to change impedance to a time varying potential as a result of an applied video signal. Further details of such a bridge control circuit for an electroluminescent cell may be had by referring to Toulon Patent 2,875,380.

The structure of FIGURE 3 includes the electroluminescent cell 40 with elementary back electrodes 42 and a continuous front electrode 44. An apertured retainer plate 46 is disposed on the electroluminescent cell with apertures 47 aligned with the back electrodes 42. Springs 49 disposed within the apertures 47 of the retainer plate 46 are designed to provide a mechanically secure fit therein for teeth on the extremity of a control circuit structure.

The control structure comprises insulating members carrying circuit components thereon and including an ionic switch assembly 50 in accordance with this invention. One support 55 carries a ferroelectric ceramic member 56 having conductors 57, 58, 59, 60 and 61 thereon for the provision of capacitors in which the ferroelectric ceramic 56 is the dielectric. Resistors 62 also extend along the ceramic 56. This member 55 is joined to another support member 65 on which resistive layers 66 are disposed. Next the ionic switch assembly 50 is provided with electrodes in line with the resistors 66 of the previous structure. A notched member 75 is provided with conductive strips 76 so that external connection may be made to a signal source. The structure is a modification of that disclosed in the Kuntz and Gannon Patent 2,998,546 and one respect in which it differs is that an ionic switch replaces a pair of switching diodes in the control circuit for each light producing element.

A more complete understanding of the structure of FIG. 3 may be had by considering it with the beforementioned patents. This structure is shown herein to demonstrate that an ionic switch assembly in accordance with this invention may be readily integrated into a complex control structure particularly for the control of the light producing elements of a display device.

Figure 4:
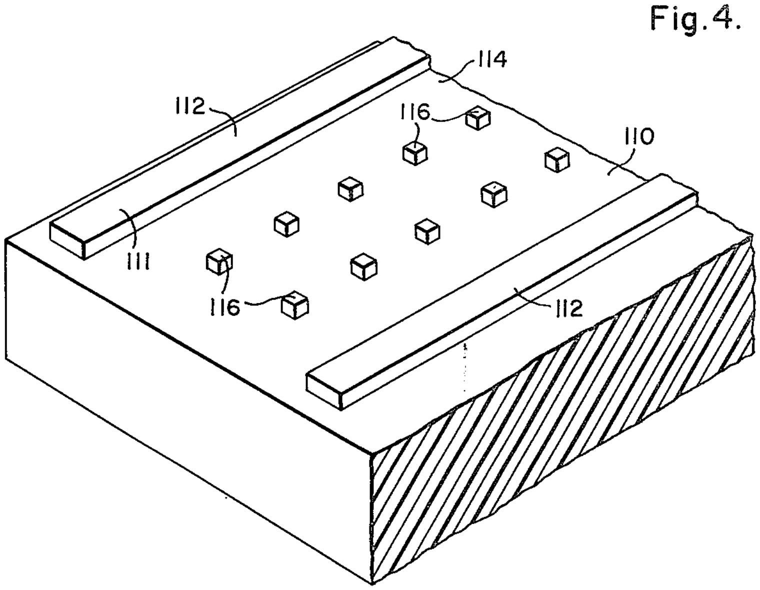
FIGURE 4 is a partial perspective view of part of an ionic switch assembly in accordance with a modification of the invention.

FIG. 4 shows a modification in which a two dimensional array of ionic switches can be provided by this invention. One carrier 110 is shown having a large area surface 114 which serves as the mounting surface for electrodes 116. The electrodes 116 may be bonded within apertures extending through the carrier 110. Raised portions 111 of the carrier provide planar reference surfaces 112 to permit the accurate gap spacing in accordance with this invention when joined with another carrier of the same nature. Processing to achieve this structure is essentially like that discussed in connection with the previous figures.

While the present invention has been shown and described in certain forms only, it will be obvious to those skilled in the art that it is not so limited, but is susceptible of various changes and modifications without departing from the spirit and scope thereof.

We claim as our invention:

1. An ionic switch assembly comprising: first and second electrode carrier members each having a planar reference surface and an electrode mounting surface; a plurality of electrodes lying on and affixed to each of said electrode mounting surfaces and extending to a predetermined distance from said surface; said first and second electrode carrier members joined together with said planar reference surfaces disposed parallel and with each electrode aligned with an electrode on the other of said carrier members so as to provide a permanent uniform gap between each pair of electrodes to provide uniformity in switching characteristics.

2. An ionic switch assembly comprising: first and second electrode carrier members each having a planar reference surface and a planar electrode mounting surface disposed in perpendicular planes, said planar reference surfaces defining a reference plane; a plurality of electrodes disposed on said electrode mounting surface of each of said electrode carrier members, each of said electrodes disposed aproximately perpendicular to said reference surfaces in alignment with one of said electrodes on the other of said electrode carrier members, all of said electrodes having an end displaced the same distance from said reference plane to define uniform gaps between each of said pairs of electrodes so that all pairs of electrodes have substantially the same switching characteristic.

3. An ionic switch assembly comprising: first and second electrode carrier members each having a planar reference surface and a planar electrode mounting surface perpendicular to said reference surface, at least said electrode mounting surface being of an electrical insulator; a beveled portion on each of said carrier members extending between said planar surfaces; a plurality of conductive electrodes disposed on said electrode mounting surfaces of each of said carrier members at least approximately perpendicular to said reference surface and extending to a predetermined distance from the plane of said reference surface, each electrode being aligned with an electrode on the other of said carrier members; a quantity of thermosetting insulating material disposed over said electrodes and said electrode mounting surfaces to maintain said electrodes in permanent position on said surfaces; said planar reference surfaces joined together by a thermosetting insulating material to maintain a permanent uniform spacing between each of said pairs of electrodes so that each pair of electrodes exhibits substantially the same switching characteristic.

4. A solid state display device comprising: a plurality of solid state light producing elements; a control structure comprising a plurality of insulating support members having electrically coupled circuit components thereon for the control of the light output of each of said solid state light producing elements; said control structure including an ionic switch assembly of first and second electrode carrier members having first and second planar surfaces and a beveled edge extending therebetween, a plurality of electrodes disposed on said first planar surface of each of said carrier members and extending to a point a predetermined distance from the plane defined by said second planar surface; a quantity of insulating material disposed on said electrodes and said first surface to form a permanent attachment thereto, said second surfaces of said carrier members being joined together so that each electrode is aligned with an electrode on the other of said carrier members with a uniform gap therebetween; said carrier members each having at least one additional surface joined to other of said insulating carrier members of said control structure so that each of said electrodes is aligned with other of said circuit components to permit connection thereto.

5. A method of making an ionic switch assembly comprising: obtaining first and second electrode carrier members each having a planar reference surface and an electrode mounting surface; bonding at least one electrode to each of said electrode mounting surfaces so that said electrodes extend beyond the plane of said planar reference surface; removing that portion of each of said electrodes extending beyond a predetermined distance of the plane of said planar reference surfaces; and bonding said carrier members together with said planar reference planes parallel and each electrode aligned with an electrode on the other of said carrier members so as to provide uniform close spacings between each pair of electrodes.

6. A method of making an ionic switch assembly comprising: obtaining first and second electrode carrier members of insulating material in the form of a rectangular parallelopiped with a beveled edge between first and second perpendicular surfaces; bending a plurality of electrodes to each of said first surfaces aproximately perpendicular to said second surface so as to extend past the plane of said second surfaces; removing material from at least each of said electrodes to place the ends of said electrodes in the same plane as said second surface; removing material from only the ends of said electrodes to displace uniformly the ends of said electrodes a predetermined distance from the plane of said second surface; bonding said first and second carrier members together by disposing said second surfaces in contact so as to provide a permanent structure with a plurality of uniform gaps between electrode pairs.

7. A method of making an ionic switch assembly comprising: obtaining first and second ceramic carriers of ceramic insulating material in the form of rectangular parallelopipeds with a beveled edge between two adjacent surfaces; bonding electrodes by thermosetting insulating material to each of said first surfaces so as to extend past the plane of said second surfaces; grinding said electrodes and said second surfaces to place them in the same reference plane with a deviation of not more than about one micron; electropolishing said electrodes so as to shorten them uniformly to a position displaced from said reference plane by one-half the desired ionic switch gap distance; and bonding said first and second carrier members together by thermosetting insulating material applied to the joint between said second surfaces and heating to cause capillary flow therebetween and a permanent set so as to provide a permanent structure with a plurality of uniform gaps between electrode pairs.

References Cited by the Examiner

UNITED STATES PATENTS

| | | | |
|---|---|---|---|
| 1,051,744 | 1/1913 | Meissner | 313—309 |
| 2,695,442 | 11/1954 | Klopping | 29—25.16 |
| 2,786,260 | 3/1957 | Farrand | 29—25.16 |
| 2,924,734 | 2/1960 | Lapple | 313—217 X |
| 2,958,009 | 10/1960 | Bowerman, Jr. | 315—169 |
| 2,959,704 | 11/1960 | Snell, Jr. et al. | 313—309 |

JOHN W. HUCKERT, *Primary Examiner.*

JAMES D. KALLAM, *Examiner.*